(12) United States Patent
Doleschal et al.

(10) Patent No.: US 8,839,909 B2
(45) Date of Patent: Sep. 23, 2014

(54) DRIVE UNIT OF A TRANSMISSION

(75) Inventors: Holger Doleschal, Wiesbaden (DE); Andreas Barylla, Gernsheim (DE)

(73) Assignee: GM Global Technology Operations LLC, Detroit, MI (US)

( * ) Notice: Subject to any disclaimer, the term of this patent is extended or adjusted under 35 U.S.C. 154(b) by 546 days.

(21) Appl. No.: 12/973,694

(22) Filed: Dec. 20, 2010

(65) Prior Publication Data
US 2011/0182537 A1 Jul. 28, 2011

(30) Foreign Application Priority Data

Dec. 21, 2009 (DE) .................... 10 2009 059 828

(51) Int. Cl.
| | | |
|---|---|---|
| *F01M 1/00* | (2006.01) | |
| *F01M 1/06* | (2006.01) | |
| *F16H 57/04* | (2010.01) | |

(52) U.S. Cl.
CPC ........ *F16H 57/0427* (2013.01); *F16H 57/0471* (2013.01); *F16H 57/0494* (2013.01)
USPC ................ 184/6.8; 184/6.5; 184/7.1

(58) Field of Classification Search
CPC ............ F16H 57/0427; F16H 57/0471; F16H 57/0494
USPC ............ 184/6.5, 6.8, 7.1, 11.1; 384/322, 462; 475/160
See application file for complete search history.

(56) References Cited

U.S. PATENT DOCUMENTS

| | | | |
|---|---|---|---|
| 4,368,802 A | 1/1983 | Grabill et al. | |
| 4,531,420 A | 7/1985 | Arai et al. | |
| 4,644,815 A | 2/1987 | Kawano et al. | |
| 4,842,100 A * | 6/1989 | Cameron et al. | 184/6.2 |
| 5,810,116 A * | 9/1998 | Kaptrosky | 184/11.1 |
| 6,110,070 A | 8/2000 | Nagai et al. | |
| 7,435,008 B2 * | 10/2008 | Kawaguchi | 384/571 |
| 2006/0257062 A1 * | 11/2006 | Kitaoka et al. | 384/474 |
| 2007/0289816 A1 | 12/2007 | Inoue et al. | |
| 2012/0213460 A1 * | 8/2012 | Radinger et al. | 384/462 |
| 2012/0270696 A1 * | 10/2012 | Pabst et al. | 475/331 |

FOREIGN PATENT DOCUMENTS

| | | |
|---|---|---|
| DE | 19819386 A1 | 11/1998 |
| JP | 2000074195 A | 3/2000 |

OTHER PUBLICATIONS

German Patent Office, Search Report for German Application No. 102009059828.6, dated Jun. 17, 2010.

* cited by examiner

*Primary Examiner* — William E Dondero
*Assistant Examiner* — Robert T Reese
(74) *Attorney, Agent, or Firm* — Ingrassia Fisher & Lorenz, P.C.

(57) ABSTRACT

A drive unit of a transmission includes, but is not limited to a main shaft. The main shaft includes, but is not limited to a bore formed along its center axis for the transport of lubricating oil. An oil transport line is provided via which a roller bearing arranged on an end section of the main shaft is at least indirectly connected to the bore.

10 Claims, 1 Drawing Sheet

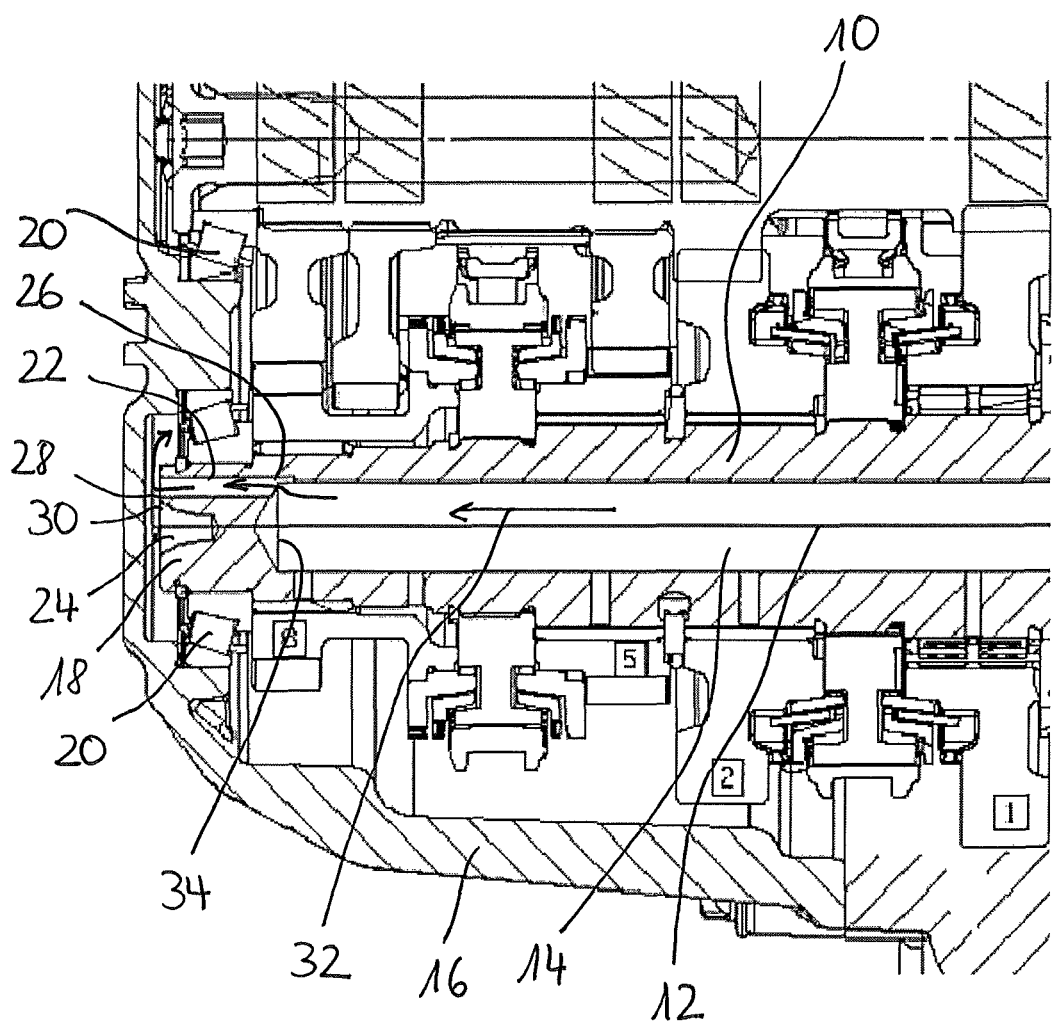

DRIVE UNIT OF A TRANSMISSION

CROSS-REFERENCE TO RELATED APPLICATION

This application claims priority to German Patent Application No. 102009059828.6, filed Dec. 21, 2009, which is incorporated herein by reference in its entirety.

TECHNICAL FIELD

The technical field relates to a drive unit of a transmission with a main shaft.

BACKGROUND

The main shaft of a transmission usually comprises a bore formed along its center axis via which from a differential gear lubricating oil can be introduced into needle bearings of the drive organs and the synchronizers arranged on the main shaft. The needle bearings exclusively serve to absorb radial forces. In addition to the needle bearings for the drive organs and the synchronizers at least one roller bearing is arranged on the main shaft which cannot only absorb radial forces but also axial forces and thus can also make available a mounting of the main shaft on the housing surrounding the main shaft. The roller bearing is usually supplied with oil via an oil channel in that lubricating oil in form of oil splashes is transported on to the roller bearing for lubricating the roller bearing. The quantity of the lubricating oil transported on to the roller bearing cannot be accurately set so that it can happen that the roller bearings are not adequately supplied with lubricating oil, which can result in increased wear of the roller bearings.

At least one object therefore is to make available a drive unit of a transmission wherein a reduction of the wear of a roller bearing can be achieved. In addition, other objects, desirable features and characteristics will become apparent from the subsequent summary and detailed description, and the appended claims, taken in conjunction with the accompanying drawings and this background.

SUMMARY

The drive unit of a transmission according to an embodiment comprises a main shaft. The main shaft comprises a bore formed along its centre axis for the transport of lubricating oil. An oil transport line is provided via which a roller bearing arranged at an end section of the main shaft is at least indirectly connected to the bore.

Advantageously it is possible by means of the oil transport line to transport lubricating oil from the bore to the roller bearing arranged on the end section of the main shaft, which allows mounting the main shaft to the housing surrounding the main shaft, so that it can be guaranteed at any time that the roller bearing is supplied with a defined quantity of lubricating oil and permanent lubrication can thus be guaranteed. The roller bearing can absorb both axial forces as well as radial forces. Preferentially the roller bearing is designed as a tapered roller bearing. The oil transport line is at least indirectly connected to the roller bearing but it is also possible that the oil transport line is directly connected to the roller bearing. Indirectly in this case means that the oil transport line is arranged in such a manner that it can transport lubricating oil from the bore in the direction of the roller bearing. The direct feeding of the lubricating oil into the roller bearing can be effected via an additional aid. In the case of a direct feed the oil transport line directly borders on the roller bearing so that no additional aids for feeding the lubricating oil are necessary. The roller bearing is then arranged on an end section of the main shaft, by way of which the main shaft is connected to the housing. The roller bearing to be lubricated with lubricating oil is thus preferentially not arranged in the middle along the main shaft as is the case with the needle bearings additionally provided on the main shaft.

According to an embodiment the oil transport line is designed as a second bore provided in the main shaft. In that the oil transport line is designed as a second bore provided in the main shaft the oil transport line can be introduced into the drive unit or into the main shaft in merely one additional manufacturing step without additional components having to be provided in the drive unit or in the main shaft. Furthermore, it is not necessary either that the housing has to be constructionally adapted to the oil transport line. Thus, merely the main shaft has to be suitably modified by introducing a second bore in order to make available an oil transport line.

Furthermore it is preferably provided that the center axis of the oil transport line is provided parallel to the center axis of the bore. Thus the oil transport line with its center axis is preferentially arranged not vertically or at an angle to the center axis of the bore but the oil transport line is preferentially designed in form of a continuation of the bore along the longitudinal direction of the bore. In that the center axis of the oil transport line is provided parallel to the center axis of the bore the lubricating oil need not be deflected so that at least no increased additional pump forces for transporting the lubricating oil through the oil transport line are necessary. However, it is also possible that the center axis of the oil transport line is provided at an angle approximately <180° to the center axis of the bore. Then, the center axis of the oil transport line is not designed parallel but at an angle to the center axis of the bore.

In addition, the oil transport line is preferably arranged with its center axis eccentrically to the center axis of the bore. Through the eccentric arrangement of the oil transport line it is not necessary to constructionally change the fastening of the main shaft to the housing. The oil transport line is thus preferentially arranged above or below the fastening of the main shaft. The fastening of the main shaft is arranged centered to the center axis of the main shaft, via which the main shaft is rotatably fastened in the housing.

According to another embodiment the oil transport line is provided with a first end at an end section along the longitudinal extension of the bore. Thus the oil transport line can be designed as a kind of extension of the bore. In addition, the lubricating oil can be transported particularly effectively from the bore to the roller bearing arranged on an end section of the main shaft.

With a second end, the oil transport line furthermore borders an end face of the main shaft. Preferentially the oil transport line starting from the bore leads as far as to the end face of the main shaft. The end face of the main shaft is preferentially arranged transversely to the center axis of the main shaft on the main shaft, wherein the end face of the main shaft preferentially borders on the housing. Because of this, the lubricating oil can be transported particularly closely to the roller bearing arranged on the end section of the main shaft.

According to another embodiment it is provided that the diameter of the oil transport line is smaller than the diameter of the bore. Because of this, particularly effective regulation of the flow conditions of the lubricating oil within the oil transport line is possible. However, it is also possible that the diameter of the oil transport line corresponds to the diameter of the bore. The oil transport line then is preferentially designed concentrically to the bore. Furthermore, it is preferably provided that as a function of the required oil quantity the diameter of the oil transport line is variably adaptable.

The embodiments furthermore relates to a transmission comprising a drive unit designed and further developed as above.

BRIEF DESCRIPTION OF THE DRAWINGS

The present invention will hereinafter be described in conjunction with the following drawing FIG. 1 that shows a schematic sectional representation of a part region of a drive unit of a transmission according to an embodiment of the invention.

DETAILED DESCRIPTION

The following detailed description is merely exemplary in nature and is not intended to limit application and uses. Furthermore, there is no intention to be bound by any theory presented in the preceding background and summary or the following detailed description.

The drive unit comprises a main shaft 10, which comprises a bore 14 for the transport of lubricating oil formed along its center axis 12. The center axis 12 of the main shaft 10 thereby corresponds to the center axis of the bore 14. The main shaft 10 is mounted in a housing 16. This mounting is affected via two roller bearings 20 arranged on the end section 18 of the main shaft 10. For transporting lubricating oil from the bore 14 an oil transport line 22 is provided, via which the lubricating oil can be transported from the bore 14 to the roller bearings 20. Here, the roller bearings 20 are preferably designed as tapered roller bearings. The oil transport line 22 with its center axis is designed parallel to the center axis of the bore 14. The oil transport line 22 is provided eccentrically to the center axis 12 of the bore 14 on the main shaft 10. Here, the oil transport line 22 is introduced into the main shaft 10 in form of a second bore, while the diameter of the oil transport line 22 is smaller than the diameter of the bore 14. In the representation shown here the oil transport line 22 is provided above a fastening 24 of the main shaft 10 on the housing 16. The oil transport line 22 with its first end 26 borders on the end section 34 of the bore 14 and extends to its second end 28 located opposite the first end 26 as far as to the end face 30 of the main shaft 10. The oil flow of the lubricating oil through the bore 14 to the oil transport line 22, through the oil transport line and in the direction of the roller bearings 20 is marked by the arrows 32.

With the embodiments it is possible to provide with lubricating oil not only the needle bearings preferentially provided in the middle on the main shaft 10 but also provide the roller bearings 20 provided on the end section 18 of the main shaft 10 with a defined lubricating oil quantity.

While at least one exemplary embodiment has been presented in the foregoing summary and detailed description, it should be appreciated that a vast number of variations exist. It should also be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

What is claimed is:

1. A drive unit of a transmission, comprising:
   a main shaft;
   a bore formed along a center axis of the main shaft for transport of a lubricating oil;
   an oil transport line, comprising a second bore in the main shaft,
      wherein a second center axis of the oil transport line is provided parallel to the center axis of the main shaft;
      wherein a first end of the oil transport line borders on an end section of the bore;
      wherein the oil transport line extends from the first end to a second end of the oil transport line; and
      wherein the second center axis of the oil transport line extends through an entirety of the oil transport line; and
   a roller bearing arranged on an end section of the main shaft is at least indirectly connected to the bore with the oil transport line.

2. The drive unit according to claim 1, wherein the oil transport line with the second center axis is arranged eccentrically to the center axis.

3. The drive unit according to claim 1, wherein the oil transport line comprises a first end and a second end section along a longitudinal extension of the bore.

4. The drive unit according to claim 3, wherein the oil transport line comprises a second end that borders on an end face of the main shaft.

5. The drive unit according to claim 1, wherein a first diameter of the oil transport line is smaller than a second diameter of the bore.

6. A transmission, comprising:
   a drive unit, the drive unit comprising:
      a main shaft;
      a bore formed along a center axis of the main shaft for transport of a lubricating oil;
      an oil transport line, comprising a second bore in the main shaft,
         wherein a second center axis of the oil transport line is provided parallel to the center axis of the main shaft
         wherein a first end of the oil transport line borders on an end section of the bore;
         wherein the oil transport line extends from the first end to a second end of the oil transport line;
         wherein the second center axis of the oil transport line extends through an entirety of the oil transport line; and
      a roller bearing arranged on an end section of the main shaft is at least indirectly connected to the bore with the oil transport line.

7. The transmission according to claim 6, wherein the second center axis is arranged eccentrically to the center axis.

8. The transmission according to claim 6, wherein the oil transport line comprises a first end and a second end section along a longitudinal extension of the bore.

9. The transmission according to claim 8, wherein the oil transport line comprises a second end that borders on an end face of the main shaft.

10. The transmission according to claim 6, wherein a first diameter of the oil transport line is smaller than a second diameter of the bore.

* * * * *